US006930164B1

(12) United States Patent
Brunelle et al.

(10) Patent No.: US 6,930,164 B1
(45) Date of Patent: Aug. 16, 2005

(54) TELECHELIC IONOMERIC POLYESTER AND METHOD OF PREPARATION THEREOF

(75) Inventors: Daniel Joseph Brunelle, Burnt Hills, NY (US); Corrado Berti, Ravenna (IT); Martino Colonna, Bologna (IT); Maurizio Fiorini, Bologna (IT); Laura Sisti, Bologna (IT)

(73) Assignee: General Electric Company, Niskayuna, NY (US)

( * ) Notice: Subject to any disclaimer, the term of this patent is extended or adjusted under 35 U.S.C. 154(b) by 3 days.

(21) Appl. No.: 10/869,715

(22) Filed: Jun. 15, 2004

(51) Int. Cl.$^7$ .......................................... C08G 63/02
(52) U.S. Cl. ..................... 528/271; 528/176; 528/196; 528/198; 528/272
(58) Field of Search ............................... 528/176, 196, 528/198, 271, 272

(56) References Cited

U.S. PATENT DOCUMENTS

| | | | |
|---|---|---|---|
| 4,554,328 A | 11/1985 | Sinker et al. | |
| 5,637,398 A | 6/1997 | Araki et al. | |
| 5,644,017 A * | 7/1997 | Drumright et al. | ......... 528/196 |
| 6,084,055 A | 7/2000 | Brunelle et al. | |

OTHER PUBLICATIONS

"Hackh's Chemical Dictionary", Fourth edition, Julius Grant, 1972, p. 533.*

"Organic Chemistry", Stanley H. Pine, fifth edition, 1987, p. 970.*

R. Scherrer, Plastics Additives Handbook, 5$^{th}$ Edition, "Colorants", 1993.

A. Eisenberg et al., "Ion-Containing Polymers", Academic Press, vol. 2, New York, pp. 15-64, 1977.

WJ MacKnight et al., "The Structure and Properties of Ionomers", Journal of Polymer Science: Macromolecular Reviews, vol. 16, pp. 41-122, 1981.

JJ Fitzgerald et al., "Synthesis,Pproperties, and Structure of Sulfonate Ionomers", Journal of Material Science, Macromol. Chem. Phys., C28(1), pp. 99-185, 1988.

Martin R. Tant et al., "An Overview of the Viscous and Viscoelastic Behavior of Ionomers in Bulk and Solution", Journal of Material Science, Macromol. Chem. Phys., C28 (1), pp. 1-63, 1988.

Huaiying Kang et al., "Synthesis and Characterization of Telechelic Poly(ethylene terephthalate) Sodiosulfonate Ionomers", American Chemical Society, Macromolecules, vol. 35, 8738-8744, 2002.

Bret J. Chsholm et al., "Nanocomposites Derived From Sulfonated Poly(butylenes terephthalate)", American Chemical Society, Macromolecules, vol. 35, pp. 5508-5516, 2002.

Corrado Berti et al., "Modification of PET By Reactive Blending With Sulfonated Esters, 1 Synthesis and Characterization of PET-Ionomers", Macromol. Symp., vol. 176, pp. 211-222, 2001.

* cited by examiner

Primary Examiner—Terressa Boykin
(74) Attorney, Agent, or Firm—Andrew J. Caruso; Patrick K. Patnode

(57) ABSTRACT

A method of preparing a telechelic ionomeric polyester includes reacting a first diol with a sulfoaromatic carboxylic acid salt to form a sulfoaromatic carboxylate ester salt, and reacting the sulfoaromatic carboxylate ester salt with a diester and a second diol in the presence of a transesterification catalyst to form a telechelic ionomeric polyester. Also disclosed are telechelic ionomeric polyesters.

21 Claims, No Drawings

TELECHELIC IONOMERIC POLYESTER AND METHOD OF PREPARATION THEREOF

BACKGROUND OF INVENTION

Ionomers, polymers containing less than 10 mol percent covalently bonded ionic substituents, exhibit considerably higher moduli and higher glass transition temperatures compared to those of their non-ionic analogues. The improvement in the polymer's mechanical and thermal performance is generally attributed to the formation of ionic aggregates. These aggregates act as thermoreversible cross-links and effectively retard the translational mobility of polymeric chains. The thermoreversible nature of the ionic aggregation may address many other disadvantages associated with covalently bonded high molecular weight polymers, such as poor melt processability, high melt viscosity, and low thermal stability at typical processing conditions such as high shear rate and temperature.

Telechelic ionomers are polymers containing the ionic substituents located only at the chain ends. Such ionomers exhibit ionic aggregation only at the end of the chain, giving rise to an electrostatic chain extension unlike random ionomers that tend to give rise to a gel-like or cross linked aggregation.

Sulfonated telechelic ionomeric poly(ethylene terephthalate) (PET) is a known telechelic ionomer. Two methods are known for the synthesis of PET sulfonated telechelic ionomers: i) reactive blending of PET with aliphatic esters of sulfobenzoic acid (Berti et al., Macromol. Symp. 2001, 176, 211) and ii) addition of sulfobenzoic acid to the melt polymerization process of ethylene glycol and dimethyl terephthalate (Kang et al., Macromolecules, 2002, 23, 8738). Both methods have their disadvantages, especially for the preparation of higher molecular weight telechelic ionomers. For example, in the first method the reaction of the sulfobenzoic acid esters with PET polymer gives rise to a chain scission resulting in PET ionomers of lower molecular weight than the starting polymer. In the second method, the sulfobenzoic acid has a high melting temperature and low solubility in the polymer melt. These properties of the sulfobenzoic acid result in the need for polar monomers, high reaction temperatures, and long residence times in order to obtain the ester exchange reaction to produce the ionomeric polyester product.

There is therefore a need for an improved method of preparing telechelic ionomeric polyesters, as well as a method of preparing high molecular weight telechelic ionomeric polyesters.

BRIEF DESCRIPTION OF THE INVENTION

One embodiment is a method of preparing a telechelic ionomeric polyester comprising reacting a diol with a sulfoaromatic carboxylic acid salt in the presence of a transesterification catalyst to form a mixture comprising hydroxy sulfoaromatic carboxylate ester salt, diol and transesterification catalyst; and reacting the mixture with a diester to form a telechelic ionomeric polyester.

In another embodiment, a method of preparing a telechelic ionomeric polyester comprises reacting a diol with a sulfoaromatic carboxylic acid salt in the presence of a transesterification catalyst to form a mixture comprising hydroxy sulfoaromatic carboxylate ester salt, diol, and transesterification catalyst; and reacting the mixture with a diester or diacid to form a telechelic ionomeric polyester; wherein the diol is according to the formula

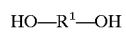

wherein $R^1$ is a $C_1$–$C_{30}$ hydrocarbylene; wherein the sulfoaromatic carboxylic acid salt has the formula

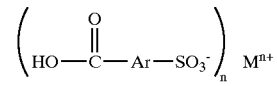

wherein Ar is unsubstituted or substituted arylene, where the substitution is $C_1$–$C_3$ hydrocarbyl; M is an alkali metal, alkaline earth metal, or transition metal; and n is 1 or 2; and wherein the diester is a compound according to the formula

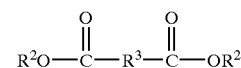

wherein $R^2$ is a $C_1$–$C_{10}$ hydrocarbyl and $R^3$ is a $C_1$–$C_{30}$ hydrocarbylene, or wherein the diacid is a compound according to the formula

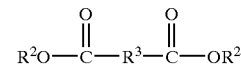

wherein $R^2$ is hydrogen and $R^3$ is a $C_1$–$C_3$ hydrocarbylene or $C_5$–$C_{30}$ hydrocarbylene.

In another embodiment, a telechelic ionomeric polyester comprises a reaction product formed by reacting a diol with a sulfoaromatic carboxylic acid salt in the presence of a transesterification catalyst to form a mixture comprising hydroxy sulfoaromatic carboxylate ester salt, diol, and transesterification catalyst; and reacting the mixture with a diester to form a telechelic ionomeric polyester, wherein the diol is according to the formula HO—$R^1$—OH wherein $R^1$ is a $C_3$–$C_{30}$ hydrocarbylene.

Other embodiments, including a composition comprising the telechelic ionomeric polyester and articles prepared from the telechelic ionomeric polyester, are described in detail below.

DETAILED DESCRIPTION

Sulfonated telechelic ionomeric polyesters can be prepared vial melt polymerization employing a preliminary step of reacting a diol with a sulfoaromatic carboxylic acid salt, in the presence of a transesterification catalyst, to form a hydroxy sulfoaromatic carboxylate ester salt. The hydroxy sulfoaromatic carboxylate ester salt and remaining diol are then further reacted in the presence of the transesterification catalyst with a diester to form a telechelic ionomeric polyester. By this method, it is possible to obtain a homogenous reaction mixture and the complete incorporation of the sulfoaromatic carboxylic acid as end groups. This method can be successfully applied to the synthesis of polyesters deriving from aliphatic or aromatic diesters and aliphatic diols, even diesters and diols having high boiling points. It has been found that the method is suitable for when a slight excess of the aliphatic diol is used.

In another embodiment, the preliminary step to form the hydroxy sulfoaromatic carboxylate ester salt is performed in the presence of a neutralizing agent. The use of the neutralizing agent in the melt polymerization process allows for the formation of telechelic ionomeric polyesters having higher molecular weights than corresponding processes absent the agent.

The terms "a" and "an" herein do not denote a limitation of quantity, but rather denote the presence of at least one of the referenced item. All ranges disclosed herein are inclusive and combinable.

Diols suitable for use to prepare the telechelic ionomeric polyester include diols according to the formula (I)

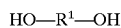  (I)

wherein $R^1$ is a hydrocarbylene. As used herein, "hydrocarbyl" refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. The hydrocarbylene residue, when so stated however, can contain heteroatoms over and above the carbon and hydrogen members of the substituent residue. Thus, when specifically noted as containing such heteroatoms, the hydrocarbylene residue can also contain carbonyl groups, amino groups, hydroxyl groups, or the like, or it can contain heteroatoms within the backbone of the hydrocarbylene residue.

Suitable hydrocarbylene residues for $R^1$ include $C_1$–$C_{30}$ carbon atoms, especially straight-chain, cyclic, branched, saturated or unsaturated alkylene residues. Also suitable for $R^1$ are hydrocarbylene residues having $C_5$–$C_{30}$ carbon atoms, more specifically, $C_8$–$C_{30}$ carbon atoms. Exemplary diols include ethylene glycol, 1,3-propane diol, 1,4-butane diol, 1,4-cyclohexanedimethanol, diethylene glycol, triethylene glycol, 2,2-dimethyl-1,3-propanediol, and the like.

The sulfoaromatic carboxylic acid salts used to prepare the hydroxy sulfoaromatic carboxylate ester salt include aromatic salts containing both a sulfonic acid functionality and a carboxylic acid functionality. Suitable sulfoaromatic carboxylic acid salts have the formula (II)

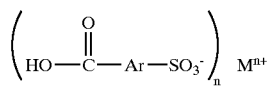  (II)

wherein Ar is unsubstituted or substituted arylene including phenylene, where the substitution is $C_1$–$C_3$ hydrocarbyl, and the like; M is an alkali metal, alkaline earth metal or transition metal; and n is 1 or 2. Suitable Ar groups include phenylene, naphthylene, and the like. Suitable alkali or alkaline earth metal salts include lithium, potassium, magnesium, calcium, and the like. Exemplary sulfoaromatic carboxylic acid salts include 3-sulfobenzoic acid sodium salt, 4-sulfobenzoic acid sodium salt, and the like.

The sulfoaromatic carboxylic acid salt is first reacted with the diol in the presence of a transesterification catalyst to produce the hydroxy sulfoaromatic carboxylate ester salt. For example, 3-sulfobenzoic acid sodium salt can be reacted with an excess of 1,4-butane diol to result in a reaction mixture containing sodium 3-(4-hydroxybutoxycarbonyl)-benzenesulfonate, the hydroxy sulfoaromatic carboxylate ester salt, and remaining unreacted 1,4-butane diol. To this reaction mixture is introduced a diester which is allowed to react to form the telechelic ionomeric polyester.

The diester that is reacted with the hydroxy sulfoaromatic carboxylate ester salt in the presence the diol and a transesterification catalyst can be of the formula (III)

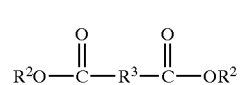  (III)

wherein $R^2$ is $C_1$–$C_{10}$ hydrocarbyl and $R^3$ is a $C_1$–$C_{30}$ hydrocarbylene. Specific $R^3$ include $C_1$–$C_{30}$ aliphatic, straight-chain, or cyclic including cyclohexylene, bicyclic, branched, saturated, or unsaturated alkylene residues, and the like; or $C_6$–$C_{30}$ arylene, including phenylene, substituted phenylene, and the like. Exemplary diesters include dimethyl cyclohexane-1,4-dicarboxylate, dimethyl terephthalate, dimethyl-2,6-naphthalene dicarboxylate, dimethyl-1,4-naphthalene dicarboxylate, and the like.

In one embodiment, a diacid can be used in place of the diester. Suitable diacids include those of formula (III) wherein $R^2$ is hydrogen and $R^3$ is a $C_1$–$C_{30}$ hydrocarbylene. Specific $R^3$ include $C_1$–$C_{30}$ aliphatic, straight-chain, or cyclic including cyclohexylene, bicyclic, branched, saturated, or unsaturated alkylene residues, and the like; or $C_6$–$C_{30}$ arylene, including phenylene, substituted phenylene, and the like. Suitable diacids include cyclohexane-1,4-dicarboxylic acid, terephthalic acid, 2,6-naphthalene dicarboxylic acid, 1,4-naphthalene dicarboxylic acid, and the like. When the diacid is used instead of a diester, the diol used can be a diol according to formula (I)

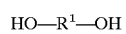  (I)

wherein $R^1$ is a hydrocarbylene. Suitable hydrocarbylene residues for $R^1$ include $C_1$–$C_3$ and $C_5$–$C_{30}$ carbon atoms, especially straight-chain, cyclic, saturated or unsaturated alkylene residues. Exemplary diols include ethylene glycol, 1,3-propane diol, 1,4-cyclohexanedimethanol, diethylene glycol, triethylene glycol, 2,2-dimethyl-1,3-propanediol, and the like.

The transesterification reaction is conducted in the presence of a transesterification catalyst. Suitable catalysts for transesterification are well-known in the art and include organometallic compounds containing at least one metal selected from the group consisting of titanium, zirconium, tin, germanium, gallium, zinc, iron, manganese, cobalt, hafnium, vanadium, iridium, lanthanum, cerium, lithium, calcium, magnesium, barium, nickel, and aluminum. When used, a single type of catalyst can be employed, or two or more kinds thereof can be employed. Exemplary types of transesterification catalysts include tetraalkyl titanate such as tetraisopropyl titanate and titanium tetrabutoxide.

The amount of transesterification catalyst used can be about 0.005 to 0.5 and more specifically about 0.02 to 0.12 mole percent based on the diester. It can, on occasion, be advantageous to introduce the catalyst in stages, with up to about 50% thereof being present at the initiation of the transesterification reaction and the balance being added subsequently, most often after about 30–50% of the total reaction time. The catalyst can be introduced into the reaction mixture by any means known in the art including adding the catalyst either neat or as a solution in an inert solvent.

The preparation of the telechelic ionomeric polyester can be performed in a three-step, two-stage process. The first stage has two steps: one to form the hydroxy sulfoaromatic carboxylate ester salt and a second to react the hydroxy sulfoaromatic carboxylate ester salt, diol, and diester or diacid to form oligomers. The second stage involves the molecular weight building to the polyester product at increased temperatures and reduced pressure.

The preparation of the hydroxy sulfoaromatic carboxylate ester salt can be performed by reacting the diol with a sulfoaromatic carboxylic acid salt at a temperature of about 100° C. to about 300° C., specifically about 200° C. to about 250° C., and more specifically about 210° C. to about 230° C. A residence time of the reaction mixture is preferably of a time until the reaction mixture becomes clear, indicating complete reaction of the sulfoaromatic carboxylic acid salt with the diol. The residence time can be, for example, about 15 minutes to about 5 hours, specifically about 30 minutes to about 3 hours, and more specifically about 1 hour to about 1.5 hours. Typically, the reacting of the diol with a sulfoaromatic carboxylic acid salt is performed in the presence of a transesterification catalyst.

The mole ratio of diol to sulfoaromatic carboxylic acid salt in the reaction to prepare the hydroxy sulfoaromatic carboxylate ester salt is preferably chosen to result in a telechelic ionomeric polyester having about 0.1 to about 10 mole percent of ionic groups, specifically about 0.5 to about 5, and more specifically about 1 to about 3 mole percent of ionic groups.

Once the hydroxy sulfoaromatic carboxylate ester salt is formed, the second step of the first stage of the reaction involves the addition of the diester or diacid to the reaction mixture containing the hydroxy sulfoaromatic carboxylate ester salt, diol, and transesterification catalyst. This step results in the formation of oligomers wherein the process can proceed at a temperature of about 100° C. to about 275° C., specifically about 150° C. to about 250° C., and more specifically about 180° C. to about 230° C. Typically the oligomeriztion process is performed at atmospheric pressure, although other pressures may be used. A residence time of the reaction mixture can be about 30 minutes to about 5 hours, specifically about 1 hour to about 3 hours, and more specifically about 1 hour to about 1.5 hours. Volatile compounds evolved during the esterification reaction are removed under the reaction conditions to drive the transesterification equilibrium to polymer.

The second stage of the process involves the reduction in pressure of the reaction vessel and an increase in the reaction temperature. Suitable pressure for the second stage can be a gradual change from atmospheric pressure to about 10 millibar, specifically to about 1 millibar, and yet more specifically about 0.1 millibar or lower. The reduction in pressure may be performed using dynamic vacuum. The reduction in pressure can be performed gradually, for example at a rate of about 1 millimeters of mercury per minute (mmHg/min), specifically a rate of about 10 mmHg/min, and more specifically a rate of about 20 mmHg/min. The temperature of the second stage can be about 200° C. to about 350° C., specifically about 225° C. to about 300° C., and more specifically about 250° C. to about 275° C. Once the desired pressure is obtained, the polymerization is allowed to proceed for a time until complete.

When the telechelic ionomeric polyester is prepared from a low volatile diol, the ratio of diol to diester can be 0.9:1 to 1.2:1, specifically 0.95:1 to 1.1:1, and yet more specifically 0.98:1 to 1:1. As used herein, low volatile diols include those having a boiling point at atmospheric pressure of greater than the initial condensation temperature of the transesterification process. Exemplary boiling points of low volatile diols can be greater than 220° C., specifically greater than 240° C. and more specifically greater than 260° C. An exemplary low volatile diol includes cyclohexanedimethanol.

When the telechelic ionomeric polyester is prepared from a volatile diol, an excess of the volatile diol can be used. Specifically, the ratio of volatile diol to diester can be greater than 1.2:1, more specifically greater than 1.3:1, and more specifically greater than 1.4:1. As used herein, a volatile diol includes the diols that have a boiling point at atmospheric pressure equal to or below the initial condensation temperature of the transesterification process. Exemplary volatile diols include ethylene glycol, 1,3-propane diol, and the like.

In one embodiment, reacting the diol with a sulfoaromatic carboxylic acid salt in the presence of a transesterification catalyst to form a hydroxy sulfoaromatic carboxylate ester salt is performed in the presence of a neutralizing agent capable of neutralizing sulfo groups (—SO$_3$H). Sulfo groups can be present in the reaction originating from the sulfoaromatic carboxylic acid salt source. Suitable neutralizing agents include phosphate salts, carbonate salts, and acetate salts. Exemplary phosphate salts include a phosphate salt according to the formula $(M^+)_xH_{(3-x)}PO_4$ wherein M is an alkali metal; x is 2–3, such as $Na_3PO_4$ and $Na_2HPO_4$. Other phosphate salts include those according to the formula $(M^{2+})_bH_j(PO_4)_{(2-j)}$ wherein M is an alkaline earth metal or a transition metal; j is 0 or 1; and b is 1 when j is 1 and b is 3 when j is 0. Examples of these salts include $Ca_3(PO_4)_2$ and $CaHPO_4$. Exemplary carbonates include $(M^+)_2CO_3$ wherein M is an alkali metal, or $M^{2+}CO_3$ wherein M is an alkaline earth metal, such as $CaCO_3$, $MgCO_3$, $Na_2CO_3$, $K_2CO_3$, and the like. Exemplary acetate salts include alkali metal acetates, such as sodium acetate.

It has been found that the presence of the neutralizing agent during the reaction process results in a telechelic ionomeric polyester having a higher molecular weight than is produced by a reaction process absent the neutralizing agent. In reactions where the diol is 1,4-butane diol, significantly less tetrahydrofuran formation is observed with the use of a neutralizing agent than comparable reactions without. In this case, when the amount of ionic groups is over 3%, the use of the neutralizing agent allows for the formation of higher molecular weight polymers. In similar reactions absent the neutralizing agent, the final weight average molecular weight tends to be below 10,000. Residues of the neutralizing agents can be removed by melt filtration at the end of the process.

The amount of neutralizing agent added to the reaction mixture of the diester, diol and hydroxy sulfoaromatic carboxylate ester salt can be about 0.05% to about 5%, more specifically about 0.1% to about 1%, and yet more specifically about 0.2 to about 0.5%, based on mol % with respect to repeat unit of final material.

In one embodiment, a telechelic ionomeric polyester comprises the reaction product formed by reacting a diol with a sulfoaromatic carboxylic acid salt in the presence of a transesterification catalyst to form a mixture comprising hydroxy sulfoaromatic carboxylate ester salt and diol; and reacting the mixture with a diester to form a telechelic ionomeric polyester, wherein the diol is according to the formula

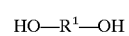

wherein $R^1$ is a $C_3$–$C_{30}$ hydrocarbylene.

Telechelic ionomeric polyesters having a molecular weight of greater than about 15,000 atomic mass units (AMU) as measured by gel permeation chromatography using a hexafluoro-isopropanol/chloroform solution (5/95 volume/volume (v/v)) and polystyrene standards, can be prepared. The telechelic ionomeric polyesters prepared can have a weight average molecular weight of about 15,000 to about 100,000 AMU, more specifically about 20,000 to about 75,000 AMU, and yet more specifically about 30,000 to about 50,000 AMU.

In another embodiment, a telechelic ionomeric polyester satisfies the formula

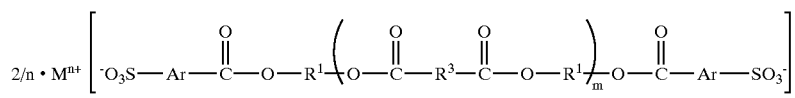

wherein M is an alkali metal, alkaline earth metal, or transition metal; n is 1 or 2; $R_1$ is $C_3$–$C_{30}$ hydrocarbylene; $R^3$ is $C_1$–$C_{30}$ hydrocarbylene; and m is 1 to about 100.

Compositions comprising the foregoing telechelic ionomeric polyester can, optionally, further comprise an additive selected from flame retardants, mold release agents and other lubricants, antioxidants, thermal stabilizers, ultraviolet stabilizers, pigments, dyes, colorants, anti-static agents, conductive agents, fillers, and the like, and combinations thereof. Examples of pigments and dyes known to the art include those described in the chapter "Colorants" in "Plastic Additives Handbook, 5$^{th}$ Edition" R. Gachter and H. Muller (eds.), P. P. Klemchuck (assoc. ed.) Hansen Publishers, New York 1993.

The invention is further illustrated by the following non-limiting examples.

EXAMPLES

Preparation of Sulfonated Ionomeric Telechelic PBT (Examples 2a–c)

A round bottom wide-neck glass reactor (250 milliliter (ml) capacity) was charged with 1,4-butane diol (BD) (50.440 grams (g); 0.560 mol), 3-sulfobenzoic acid sodium salt (3-SBANa) (2.686 g; 0.0120 mol) and titanium tetrabutoxide (TBT) (109 milligrams (mg) corresponding to 175 parts per million (ppm) as titanium with respect to the final polymer).

The reactor was closed with a three-neck flat flange lid equipped with a mechanical stirrer and a torque meter. The system was then connected to a water-cooled condenser and immersed in a thermostatic oil-bath at 230° C. and the stirrer switched on at 100 revolutions per minute (rpm). After 1 hour the reaction mixture became clear and the oil bath was cooled to 180° C. Dimethyl terephthalate (DMT) (77.624 g; 0.400 mol) was then carefully added and the temperature increased to 215° C. in 30 minutes and kept at this temperature for additional 90 minutes. The distillate recovered during this first stage in the condenser was collected and analyzed by $^1$H-NMR in order to measure the amount of THF formed. The temperature was then increased to 245° C., the lid was heated at a temperature of 140° C. with a heating band and the reactor connected to a liquid nitrogen cooled condenser. Dynamic vacuum was then applied in 20 minutes down to 0.2 millibar (mbar). After 100 minutes the very viscous pale yellow and transparent melt was discharged from the reactor.

Examples 1 and 3 were prepared according to the procedure of Examples 2a–c, but with varying amounts of 3-SBANa. Comparative Example 1 was PBT obtained according to the same procedure as Example 1, but without the initial step of reaction.

Preparation of Random Sulfonated PBT (Comparative Example 2)

For comparison, random sulfonated PBT with 3% (by mol) ionic content was synthesized by adding dimethyl 5-sulfoisophthalate sodium salt (DMSIP) at the beginning of the polymerization. In this case, the second stage was stopped just after 30 minutes from the application of full vacuum since the melt viscosity was to high to permit stirring and removal of the polymer melt from the reactor. This behavior confirms that for random ionomers, the ionic interactions give rise to gel-like or cross linked aggregations and therefore to a very high melt viscosity, while for the telechelics the ionic aggregations occur only at the end of the chain, giving rise to chain extension by electrostatic interactions.

Table 1 provides the ionic group content and the weight average molecular weight of the PBT telechelic ionomers (Examples 1, 2a–c, and 3) as well as PBT polyester (Comparative Example 1) and the random PBT ionomer prepared from DMSIP (Comparative Example 2). Also provided is the ratio of sulfonated end groups to total end groups. The weight average molecular weight (Mw) was determined by gel permeation chromatography (GPC) versus polystyrene standards.

TABLE 1

| Polymerization run | 3-SBANa added (mol %)* | Ionic content in crude polymer (mol %)* | Ionic content after purification (mol %)* | Sulfonated end groups/ Total end groups** | Mw (GPC) |
|---|---|---|---|---|---|
| Comparative Example 1 | — | — | — | — | 113500 |
| Example 1 | 1.5 | 1.4 | 1.4 | 0.75 | 56600 |
| Example 2a | 3 | 2.8 | 2.8 | 0.85 | 45800 |
| Example 2b | 3 | 2.9 | 2.8 | 0.78 | 44300 |
| Example 2c | 3 | 2.8 | 2.7 | 0.81 | 42100 |
| Example 3 | 5 | 4.8 | 4.8 | 0.90 | 29700 |
| Comparative Example 2 | 3% DMSIP | 3% random ionomer | 2.9 | — | *** |

*respect to terephthalic units
**measured by $^1$H-NMR, thus not taking into account COOH end groups.
***Mw of random ionomer could not be performed by GPC analysis The GPC results in Table 1 show a good reproducibility of the experimental procedure (compare Mw for Examples 2a, 2b, and 2c). The telechelic ionomers are mainly terminated with sulfonated groups and the percentage of ionic end groups increases with the amount of ionic end capping agent added. The incorporation of the SBANa has been confirmed by $^1$H-NMR analysis of the polymer dissolved in a deuterated trifluoroacetic acid/deuterated chloroform (1/4 volume/volume (v/v)) and precipitated in methanol (SBANa is soluble in methanol).

The results of Differential Scanning Calorimetry (DSC) analysis of PBT sulfonated telechelics conducted both in isothermal and in gradient conditions are presented in Table 2. The analysis was performed on a DSC7 from Perkin Elmer Instruments with a heating and cooling rate of 20° C./min. All transitions have been measured after a heating scan to 250° C. and cooling to room temperature at 20° C./min in order to delete previous thermal history. Crystallization times have been measured at the maximum of the crystallization peak in isothermal conditions. Tm=melting temperature; ΔHm=heat of melting in units of Joules per gram; Tc=crystallization temperature; ΔHc=heat of crystallization in units of Joules per gram; and crystallization time at 200° C. and 205° C. in minutes (min).

TABLE 2

| Polymerization run | Ionic content (mol %) | Tm (° C.) | ΔHm (J/g) | Tc (° C.) | ΔHc (J/g) | Cryst. time at 200° C. (min) | Cryst. time at 205° C. (min) |
|---|---|---|---|---|---|---|---|
| Comparative Example 1 | — | 223.7 | 41.3 | 183.7 | 44.9 | 5.7 | 38.9 |
| Example 1 | 1.4 | 222.3 | 42.9 | 184.5 | 49.4 | 1.3 | 7.1 |
| Example 2a | 2.8 | 223.0 | 44.7 | 183.1 | 50.5 | 1.5 | 8.9 |
| Example 2b | 2.8 | 222.7 | 42.8 | 183.3 | 51.0 | 1.6 | 9.3 |
| Example 2c | 2.7 | 222.8 | 42.5 | 183.1 | 50.6 | 1.5 | 9.1 |
| Example 3 | 4.8 | 222.7 | 47.9 | 183.9 | 53.3 | 2.1 | 12.1 |
| Comparative Example 2 | 3% DMSIP | 221.3 | 43.2 | 182.6 | 45.8 | 29.4 | — |

There are no significant differences in Tm and ΔHm for the telechelic ionomers with respect to control PBT (Comparative Example 1). However, the ΔHc is higher for the polymers with higher sulfonate content. Crystallization times for all of the telechelic ionomers are much shorter that that for the control PBT. Shorter crystallization times correspond to faster manufacturing and lower cost, since crystallization upon molding is required in order to obtain good solvent resistance. The crystallization time (measured as peak time in isothermal conditions) in telechelic polymers increases with the ionomer content even if the molecular weight follows an opposite trend. It is suspected that the electrostatic interactions between the polymer chain ends give rise to an increase in melt viscosity that overcomes the decrease due to the lower molecular weight. This is not the case for the non-ionomeric control PBT for which the crystallization time is consistently longer compared to ionomers due to the very high difference in molecular weights. The random ionomer presents a consistently slower crystallization rate even if its molecular weight is very low (second stage time was only 30 minutes) indicating that the ionic groups along the polymer chains act as cross-link agents giving rise to a gel like aggregate and therefore to a very high melt viscosity.

Preparation of Sulfonated Ionomeric Telechelic PCCD (Examples 5a–b)

A round bottom wide-neck glass reactor (250 ml capacity) was charged with 1,4-cyclohexanedimethanol (CHDM) (57.352 g; 0.398 mol), 3-SBANa (2.716 g; 0.0121 mol) and TBT (174 mg; 175 ppm of titanium with respect to the final polymer).

The reactor was closed with a three-neck flat flange lid equipped with a mechanical stirrer and a torque meter. The system was then connected to a liquid nitrogen cooled condenser and immersed in a thermostatic oil-bath at 220° C. After 90 minutes the reaction mixture became clear and the oil bath was cooled to 160° C. Dimethyl cyclohexanedicarboxylate (DMCD) (78.454 g; 0.392 mol) was then carefully added and the temperature increased to 180° C. and kept at this temperature for additional 60 minutes and then increased at 230° C. for 20 minutes.

The stirring was set on (50 rpm), the oil-bath temperature was increased to 253° C. and vacuum was slowly and carefully applied decreasing the internal pressure from 70 to 0.2 mbar in 20 min. The lid was heated at a temperature of 140° C. with a heating band. After 100 minutes the very viscous pale yellow and transparent melt was discharged from the reactor, indicating that no unreacted sulfobenzoic acid was present. The $^1$H-NMR analysis confirmed the complete incorporation of the sulfobenzoic acid as chain end.

Examples 4 and 6 were prepared according to the procedure of Examples 5a–b, but with varying amounts of 3-SBANa. Comparative Example 3 was a PCCD polyester obtained according to the same procedure as Example 4, but without the initial step of reaction.

The results of the NMR and GPC characterization of PCCD telechelics are reported in Table 3 as well as the Mw of the non-ionomeric PCCD polyester (Comparative Example 3).

TABLE 3

| Polymerization run | 3-SBANa added (mol %)* | ionic content (mol %)* | Sulfonated end groups/ Total end groups | Trans content (%) | Mw (GPC) |
|---|---|---|---|---|---|
| Comparative Example 3 | — | — | — | 97 | 78800 |
| Example 4 | 1.5 | 1.5 | 0.5 | 97 | 49700 |
| Example 5a | 3 | 2.9 | 0.6 | 97 | 40500 |
| Example 5b | 3 | 2.8 | 0.6 | 97 | 39600 |
| Example 6 | 5 | 4.8 | 0.7 | 97 | 26600 |

*Respect to cyclohexane dicarboxylate units

A $^{13}$C-NMR analysis of Examples 4, 5a–b, and 6 show that no isomerization from trans to cis takes place for the ionomeric telechelics in the polymerization conditions, thus indicating that the sulfonate groups do not catalyze isomerization.

The results of DSC analysis of PCCD sulfonated telechelics conducted both in isothermal and in gradient conditions are presented in Table 4, along with the glass transition temperature (Tg) of the sample. Comparative Example 4 and 5 are control PCCD polyesters (non-ionomeric) GE 2000 and GE 4000 respectively, available from GE Plastics.

TABLE 4

| Polymerization run | 3-SBANa added (mol %)* | Ionic content (mol %) | Tm (° C.) | ΔHm (J/g) | Tc (° C.) | ΔHc (J/g) | Tg (° C.) |
|---|---|---|---|---|---|---|---|
| Comparative Example 3 | — | — | 233.0 | 29.5 | 178.9 | −28.7 | 68.9 |
| Example 4 | 1.5 | 1.5 | 234.4 | 28.3 | 185.6 | −32.9 | 69.1 |
| Example 5a | 3 | 2.9 | 229.3 | 34.3 | 179.6 | −32.5 | 68.5 |
| Example 6 | 5 | 4.8 | 227.3 | 36.3 | 164.2 | −35.4 | 69.2 |
| Comparative Example 4 | 0 | — | 223.3 | 29.6 | — | — | 67.5 |
| Comparative Example 5 | 0 | — | 217.3 | 23.5 | — | — | 69.4 |

*Respect to cyclohexane dicarboxylate units

As the results indicate, there are significant differences in Tm, ΔHm, Tc and ΔHc between telechelic ionomers and control PCCD (Comparative Examples 4–5). In particular, a decrease in Tm and Tc and an increase in ΔHm and ΔHc can be observed with an increase in the ionic content. Again, it is believed that the electrostatic interactions increase the melt viscosity overcoming the decrease due to the lower Mw and, therefore, the polymer with higher ionomer content tends to crystallize more slowly compared to those with lower ionomer content. No significant differences can be observed in Tg.

Preparation of Telechelic Ionomeric Polyester Using a Neutralizing Agent

Example 7 was prepared according to the procedure of Examples 2a–c, but with the addition of 0.00130 mol of a phosphate salt (0.35% by mol respect to the repeating unit of the final polymer) added at the beginning of the reaction. The 3-(4-hydroxybutoxycarbonyl)-benzenesulfonate was allowed to form prior to the addition of DMT ($1^{st}$ stage). Table 5 provides the results of polymerizations using the three different phosphate salts and a carbonate salt. The phosphate salts studied included sodium dihydrogen phosphate ($NaH_2PO_4$), trisodium phosphate ($Na_3PO_4$), and sodium hydrogen phosphate ($Na_2HPO_4$) and the carbonate salt was sodium carbonate. It was found that trisodium phosphate (Example 8) and sodium hydrogen phosphate (Example 9) result in the formation of a polyester having a Mw of greater than 37,000. It should be noted that both Examples 8 and 9 had reduced amounts of tetrahydrofuran (THF) formation. For Example 8, the amount of THF formed in both stages of the reaction (as measured by $^1$H-NMR analysis of the distillates recovered in the condensers) was from 40 to 50% lower compared to the amounts recovered in Examples 2a–c and similar to the amount observed for Comparative Example 1. As illustrated by Example 7, $NaH_2PO_4$ is not sufficiently basic to buffer the sulfo groups, and in the step to form the 3-(4-hydroxybutoxycarbonyl)-benzenesulfonate, a large amount of BD converts to THF. Example 10 illustrates the use of sodium carbonate and the formation of a telechelic ionomeric PBT having a Mw of above 45,000.

TABLE 5

| Polymerization run | SBANa fed (mol % w/ respect to DMT) | Neutralizing Agent | THF in $1^{st}$ stage (mol % with respect to BD) | Mw GPC |
|---|---|---|---|---|
| Comparative Example 6 | — | — | 1.57 | 87900 |
| Example 7 | 3 | $NaH_2PO_4$ | 17.7 | below 10000 |
| Example 8 | 3 | $Na_3PO_4$ | 2.07 | 42140 |
| Example 9 | 3 | $Na_2HPO_4$ | 3.06 | 37500 |
| Example 10 | 3 | $Na_2CO_3$ | 2.06 | 47450 |
| Example 11 | 3 | $Na_3PO_4$ | 2.90 | 44000 |
| Example 12 | 3 | NaOAc | 1.54 | 45880 |

Example 11 provides an example of a large-scale reaction to prepare the ionomeric telechelic PBT in the presence of $Na_3PO_4$ as the sulfo group neutralizing agent. The reaction was conducted using a 1.8 L stainless steel batch reactor equipped with a paddle stirrer (driven at 30 revolutions per minute (rpm)) and a strain-gauge sensor mounted on the stirrer shaft in order to monitor the viscosity of the reaction melt (and indirectly the increase of PBT molecular weight) during the polymerisation. Two condensers in series (the first water-cooled and the second liquid nitrogen-cooled) were connected to the reactor to collect volatile products during the first and second stages. First stage: BD (458 g; 5.09 mol), 3-SBANa (24.39 g; 0.110 mol), TBT (1.05 g corresponding to 175 parts per million (ppm) as titanium with respect to the final polymer) and $Na_3PO_4$ (4.69 g, 0.012 mol) were introduced into the reactor. The temperature of the reactor was increased to 230° C. and the stirrer switched on at 30 rpm. After 1 hour the reactor was cooled to 180° C. DMT (705 g; 3.63 mol) was then added into the reactor and the temperature increased to 215° C. in 30 minutes. Volatile products (methanol and THF) were distilled off from the reactor, condensed in the water-cooled condenser and were collected in a graduated cylinder. The distillate was analyzed by $^1$H-NMR in order to measure the amount of THF formed. The temperature was then kept at 215° C. until at least 85% (corresponding to 245 ml) of the theoretical amount of methanol was distilled off. Second stage: the internal pressure was slowly reduced from atmospheric pressure down to 1 millibar in 20 minutes. At the same time the temperature of the reaction melt was increased to 245° C. and kept at this temperature until the end of the polymerisation. The second stage was stopped when no further significant increase in strain gauge signal was detected.

Example 12 illustrates the use of sodium acetate (NaOAc) as the neutralizing agent providing a telechelic ionomeric polyester having a Mw of greater than 45000.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preparing a telechelic ionomeric polyester, comprising:
   reacting a diol with a sulfoaromatic carboxylic acid salt in the presence of a transesterification catalyst to form a mixture comprising hydroxy sulfoaromatic carboxylate ester salt, diol, and transesterification catalyst; and
   reacting the mixture with a diester, said diester having the structure

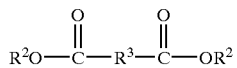

wherein $R^2$ is a $C_1$–$C_{20}$ hydrocarbyl and $R^3$ is a $C_1$–$C_{30}$ hydrocarbylene, to form a telechelic ionomeric polyester.

2. The method of claim 1, wherein the diol is according to the formula

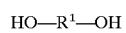

wherein $R^1$ is a $C_1$–$C_{30}$ hydrocarbylene.

3. The method of claim 1, wherein the diol is selected from the group consisting of ethylene glycol, 1,3-propane diol, 1,4-butane diol, cyclohexane dimethanol, diethylene glycol, triethylene glycol, 2,2-dimethyl-1,3-propanediol, and combinations thereof.

4. The method of claim 1, wherein $R^3$ is selected from the group consisting of phenylene, 1,4-cyclohexylene, 2,6-naphthalene, and 1,4-naphthalene.

5. The method of claim 1, wherein the sulfoaromatic carboxylic acid salt is an alkali metal salt, alkaline earth metal salt, or transition metal salt of 3-sulfobenzoic acid or 4-sulfobenzoic acid.

6. The method of claim 1, wherein the transesterification catalyst is an organometallic compound comprising titanium, zirconium, tin, germanium, gallium, zinc, iron, manganese, cobalt, hafnium, vanadium, iridium, lanthanum, cerium, lithium, calcium, magnesium, barium, nickel, or aluminum.

7. The method of claim 1, wherein the transesterification catalyst is a tetraalkyl titanate.

8. The method of claim 1, wherein the reacting the diol with the sulfoaromatic carboxylic acid salt is performed in the presence of a neutralizing agent.

9. The method of claim 8, wherein the neutralizing agent is selected from the group consisting of a phosphate salt according to the formula $(M^+)_x H_{(3-x)} PO_4$ wherein M is an alkali metal, and x is 2–3; a phosphate salt according to the formula $(M^{2+})_b H_j (PO_4)_{(2-j)}$ wherein M is an alkaline earth metal or a transition metal, j is 0 or 1, and b is 1 when j is 1 or b is 3 when j is 0; an alkali metal carbonate salt; an alkaline earth metal carbonate salt; and alkali metal acetate salt.

10. The method of claim 8, wherein the neutralizing agent is selected from the group consisting of $Na_3PO_4$, $Na_2HPO_4$, $CaCO_3$, $Na_2CO_3$, $K_2CO_3$, $MgCO_3$, NaOAc, and combinations thereof.

11. The method of claim 1, wherein reacting the diol with a sulfoaromatic carboxylic acid salt is performed at a temperature of about 100 to about 300° C., and wherein reacting the mixture with a diester is performed at a temperature of about 100 to about 275° C.

12. The method of claim 1, wherein the reacting the diol with a sulfoaromatic carboxylic acid salt is performed for a period of time of about 15 minutes to about 5 hours; and wherein the reacting the mixture with a diester is performed for a period of time of about 30 minutes to about 5 hours.

13. The method of claim 1, wherein the reacting the mixture with a diester is performed in two stages, wherein the second stage is performed under reduced pressure.

14. A telechelic ionomeric polyester comprising a reaction product formed by
reacting a diol with a sulfoaromatic carboxylic acid salt in the presence of a transesterification catalyst to form a mixture comprising hydroxy sulfoaromatic carboxylate ester salt, diol, and transesterification catalyst; and
reacting the mixture with a diester, said diester having the structure

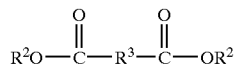

wherein $R^2$ is a $C_1$–$C_{10}$ hydrocarbyl and $R^3$ is a $C_1$–$C_{30}$ hydrocarbylene to form a telechelic ionomeric polyester, wherein the diol is according to the formula

HO—R$^1$—OH wherein $R^1$ is a $C_3$–$C_{30}$ hydrocarbylene.

15. The telechelic ionomeric polyester of claim 14, wherein the reacting the diol with the sulfoaromatic carboxylic acid salt is performed in the presence of a neutralizing agent.

16. The telechelic ionomeric polyester of claim 14, having a weight average molecular weight of about 15,000 to about 100,000 AMU.

17. A composition comprising the telechelic ionomeric polyester of claim 14 and a dye or colorant.

18. An article prepared from the telechelic ionomeric polyester of claim 14.

19. A method of preparing a telechelic ionomeric polyester, comprising:
reacting a diol with a sulfoaromatic carboxylic acid salt in the presence of a transesterification catalyst to form a mixture comprising hydroxy sulfoaromatic carboxylate ester salt, diol, transesterification catalyst; and
reacting the mixture with a diester or diacid to form a telechelic ionomeric polyester;
wherein the diol is according to the formula

HO—R$^1$—OH wherein $R^1$ is a $C_1$–$C_{30}$ hydrocarbylene;
wherein the sulfoaromatic carboxylic acid salt has the formula

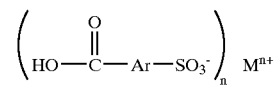

wherein Ar is unsubstituted or substituted arylene, where the substitution is $C_1$–$C_3$ hydrocarbyl; M is an alkali metal, alkaline earth metal, or transition metal; and n is 1 or 2; and
wherein the diester is a compound according to the formula

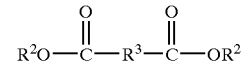

wherein $R^2$ is a $C_1$–$C_{10}$ hydrocarbyl and $R^3$ is a $C_1$–$C_{30}$ hydrocarbylene, or
wherein the diacid is a compound according to the formula

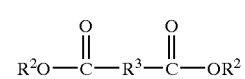

wherein $R^2$ is hydrogen and $R^3$ is a $C_1$–$C_3$ hydrocarbylene or $C_5$–$C_{30}$ hydrocarbylene.

20. A telechelic ionomeric polyester having the formula

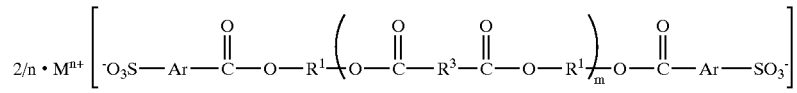

wherein M is an alkali metal, alkaline earth metal, or transition metal; n is 1 or 2; $R^1$ is $C_3$–$C_{30}$ hydrocarbylene; $R^3$ is $C_1$–$C_{30}$ hydrocarbylene; and m is 1 to about 100.

21. The telechelic ionomeric polyester of claim 20, wherein $R^1$ is propylene, butylene, cyclohexane dimethylene, diethylene, triethylene, 2,2-dimethyl-1,3-propylene, or combinations thereof; $R^3$ is phenylene, cyclohexylene, 2,6-naphthalene, 1,4-naphthalene, or combinations thereof; and M is sodium, lithium, potassium, magnesium, or calcium.

* * * * *